United States Patent [19]
Lehner et al.

[11] 3,713,088
[45] Jan. 23, 1973

[54] REMOTELY OPERATED SEISMOMETER

[75] Inventors: Francis E. Lehner, Monrovia; Wayne F. Miller, Arcadia, both of Calif.

[73] Assignee: California Institute of Technology, Pasadena, Calif.

[22] Filed: Aug. 13, 1970

[21] Appl. No.: 63,512

[52] U.S. Cl. .................340/17, 73/1 D, 73/517 R, 73/517 B, 73/382
[51] Int. Cl. .................................................G01v 1/16
[58] Field of Search....340/17; 73/1 D, 517 B, 518 R, 73/517 R, 382

[56] References Cited

UNITED STATES PATENTS

| | | | |
|---|---|---|---|
| 3,413,854 | 12/1968 | Graf | 73/382 |
| 3,517,544 | 6/1970 | Janssen | 73/30 |
| 3,297,982 | 1/1967 | Beach | 340/17 |
| 3,286,229 | 11/1966 | Millis | 340/17 |
| 2,792,562 | 5/1957 | Baker | 340/17 |

Primary Examiner—Benjamin A. Borchelt
Assistant Examiner—R. Kinberg
Attorney—Lindenberg, Freilich & Wasserman

[57] ABSTRACT

A seismometer suitable for remote operation to measure quake components, comprising a boom mounted for pivoting about a nominally vertical or other axis, the boom carrying a sensing coil and a small iron slug. A pair of calibration coils mounted on opposite sides of the slug can be individually energized to deflect the boom in opposite directions from its static position. The sensing coil outputs resulting from separate energizations of the calibration coils, indicate the precise static position of the boom and therefore, in the case of a boom intended to pivot about a vertical axis, the angle of its nominally vertical axis of pivoting from a true vertical. The sensing coil is flat and is surrounded by a frame of non-conductive material with conductive layers on opposite sides that are electrically connected to the ends of the coil. The frame is supported by a pair of mass members which are insulated from each other but connected to the respective conductive layers on the frame. The mass members are mounted on separate Cardin hinges, and currents generated by the sensing coil are transmitted through the Cardin hinges to output terminals.

10 Claims, 5 Drawing Figures

PATENTED JAN 23 1973

FRANCIS E. LEHNER
WAYNE F. MILLER
INVENTORS

BY
Lindenberg Freilich & Wasserman
ATTORNEYS

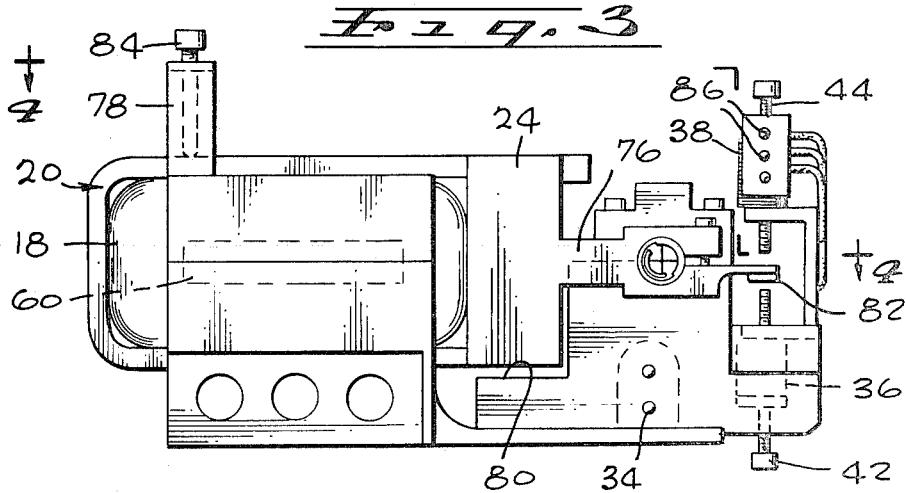
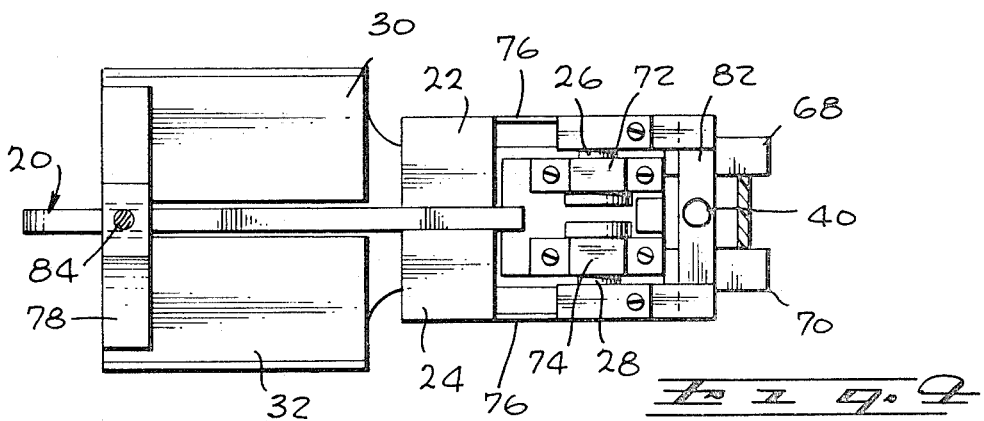
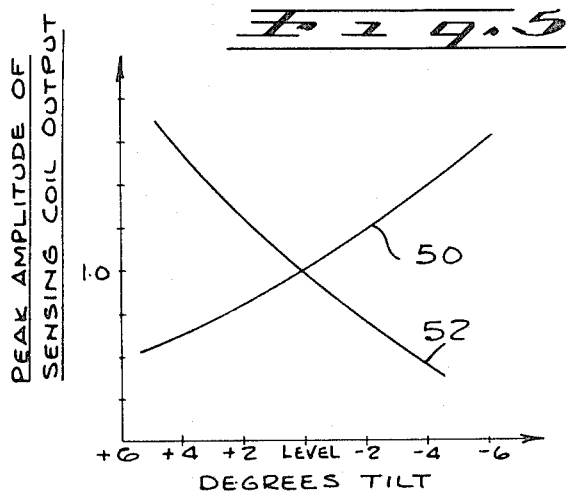
FRANCIS E. LEHNER
WAYNE F. MILLER
INVENTORS
BY
Lindenberg Frelich & Wasserman
ATTORNEYS

REMOTELY OPERATED SEISMOMETER

ORIGIN OF INVENTION

The invention described herein was made in the performance of work under NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to seismometers.

2. Description of the Prior Art

Most seismometer installations require three seismometers for measuring three orthogonal components of quakes, two of the seismometers generally measuring horizontal components. Many seismometers employ pivoting booms, and when such seismometers are used to measure horizontal quake components, they are set up so that the boom can pivot about a vertical axis. Where an operator is present, he can manipulate leveling feet to orient the axis of pivoting in a precisely vertical direction. However, in those applications where an operator is not available, as in the case of unmanned craft which are intended to record quakes on the moon or planets, there is no operator available to perform such leveling. Instead of resorting to complex automatic leveling devices, the amplitude and direction of quakes can be determined by merely correcting for deviation from accurate leveling. Apparatus which could indicate the degree of such deviation, but which added a minimum of complexity to the equipment, would be desirable for such seismometers. Of course, a construction of such seismometers which resulted in the greatest compactness and ruggedness is also required on unmanned extra-terrestrial missions.

OBJECTS AND SUMMARY OF THE INVENTION

An object of the present invention is to provide a seismometer with a pivotally mounted boom, which, in addition to sensing ground oscillations, indicates the deviation of the axis of pivoting of its boom from the vertical.

Another object is to provide a highly compact and rugged seismometer.

In accordance with one embodiment of the present invention, a compact and rugged seismometer is provided which can indicate the accuracy of its leveling to an operator at a remote station. The seismometer includes a boom that is pivotally mounted on a main frame to pivot above a nominally vertical axis, the boom carrying a sensing coil that moves between a pair of magnets so that motion of the boom causes a current to be generated in the coil. The boom also carries a small iron slug, and the main frame carries a pair of calibration coils that are located on opposite sides of the slug. Currents to the different calibration coils tend to pivot the boom in opposite directions, the amounts of pivoting being equal if the pivotal axis of the boom is precisely vertical. However, if the pivotal axis is angled from the vertical, then energization of the different calibration coils results in differing amounts of pivoting of the boom. The difference in the amount of pivoting indicates the precise misalignment of the axis from the vertical.

The boom of the seismometer has a flat coil surrounded by a coil frame of insulating material which is plated with a conductive layer on opposite faces thereof. The ends of the coil are connected to the opposite conductive layers of the coil frame, so that connections to the coil can be made through the more rugged conductive layers of the frame than to the delicate wire of the coil. The coil frame is supported by a pair of mass members which are disposed against the conductive layers on its opposite faces to make contact therewith, the mass members being constructed of conductive material and being insulated from each other. Each of the mass members is mounted on a separate hinge, and current is conducted through the hinge to terminals on a main frame that pivotally supports the boom. The conduction of current through the hinges eliminates the need for delicate wires from the boom to the main frame, which could easily be broken.

The novel features of the invention are set forth with particularity in the appended claims. The invention will be best understood from the following description when read in conjunction with the accompanying drawings.

BRIEF DESCRIPTION OF THE DRAWINGS

FIG. 3 is a plan view of the seismometer mechanism of FIG. 1;

FIG. 4 is a view taken on the line 4—4 of FIG. 3; and

FIG. 5 is a graph showing the calibration characteristics of the seismometer mechanism of FIG. 1.

DESCRIPTION OF THE PREFERRED EMBODIMENTS

Figure 1:
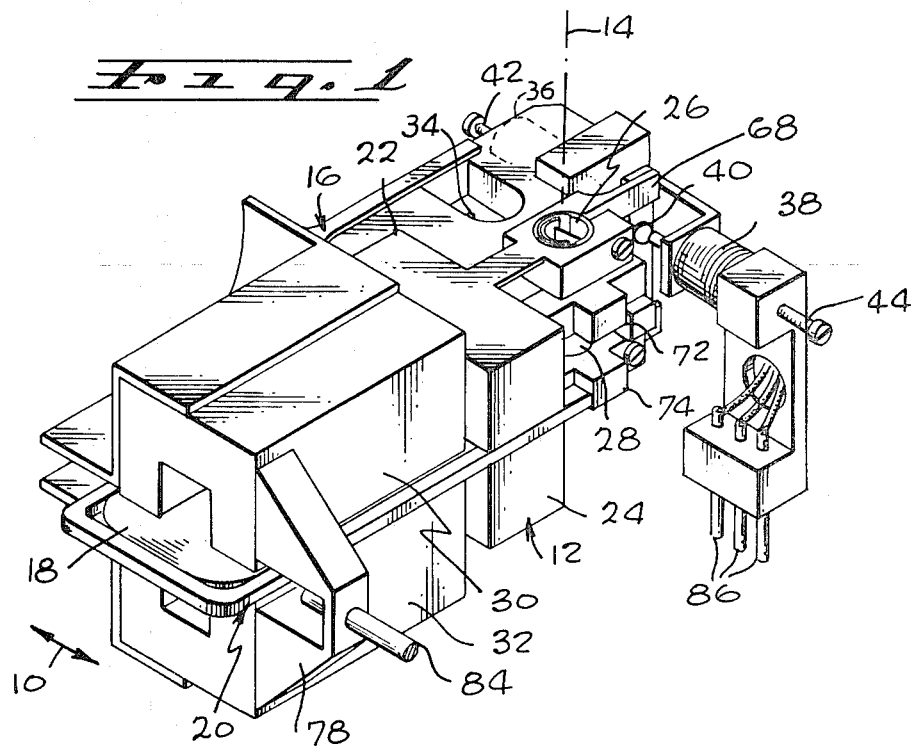
FIG. 1 is a perspective view of a seismometer mechanism constructed in accordance with the present invention.

FIG. 1 illustrates a seismometer mechanism for measuring horizontal components of quakes in the direction of arrows 10, the seismometer including a boom 12 which is pivotally mounted about an axis 14 on a main frame 16. The boom 12 includes a sensing coil 18 held by a coil frame 20, the coil frame being held by a pair of mass members 22, 24 that are pivotally mounted on the main frame by a pair of Cardin type hinges 26, 28. The main frame 16 carries a pair of permanent magnets 30, 32 which are disposed on opposite sides of the coil 18, so that when the sensing coil moves as the boom pivots, currents are generated in the coil. These currents are carried from the coil 18 to a pair of sensing coil output terminals 34 on the main frame. The seismometer can be used in remote operations such as in craft that are landed on the moon or other planets to measure quakes thereon, and the terminals 34 may be connected to a telemetry system for transmitting information about the currents to a remote station such as one on the Earth.

The seismometer mechanism shown in FIGS. 1, 3 and 4 is generally one of three seismometers in an assembly for measuring quake components in three orthogonal directions, two of the seismometers being used to measure horizontal components and and the other being used to measure vertical components. In order to measure the horizontal components of quakes in the direction of arrows 10, the pivotal axis 14 of the boom should be oriented in a precise vertical direction with respect to local gravity. However, the instrument package may be landed so that the axis 14 makes an angle of several degrees with the local vertical. It would be possible to provide an automatic leveling system for pivoting the mechanism so that the axis 14 is precisely aligned with the vertical, but this would require a system of substantial complexity and added weight. Instead of reorienting the seismometer, it is constructed so that information can be transmitted to indicate the precise angle of misalignment of the axis 14 with the vertical. This allows operators at the remote station to compensate for the misalignment so that any quake measurements can be compensated to yield accurate information about any quake occurrences.

In accordance with the invention, information about the orientation of the seismometer is obtained by the use of a pair of calibration coils 36, 38 mounted on the main frame and an iron slug 40 mounted on the boom between the calibration coils. The calibration coils 36, 38 are substantially identical, and have cores in the form of iron screws 42, 44 that can be turned to move towards or away from the iron slug 40 for calibrating the device. If the seismometer is oriented with axis 14 precisely vertical, then the boom 12 will assume a predetermined central position as shown in FIG. 1. With the boom in this central position, the mechanism may be initially adjusted so that the cores 42, 44 are at the same distance from the slug 40. A current pulse through either calibration coil 36 or 38 will then pivot the boom 21 in precisely the same amount, although in opposite directions. If the axis 14 is angled with a component in the direction of either arrow 10 away from the vertical, then the boom will assume a rest position wherein the slug 40 will be closer to one calibration coil than the other. If a pulse is then sent through the calibration coils in turn, the calibration coil which is closer to the slug 40 will produce a larger swing of the boom than will be produced by a current pulse of equal magnitude applied to the other calibration coil. The magnitude of this different in swing produced by a pulse of given magnitude indicates the degree of misalignment of the axis of pivoting 14 of the boom from the local vertical. The amount of pivoting of the boom is determined by the current generated by the sensing coil 18 which generates a current as it moves between the permanent magnets 30, 32.

The graphs of FIG. 5 illustrate the change in boom swing resulting from tilting of the axis of pivoting 14 away from the vertical. The swing of the boom is given by the peak output from the sensing coil 18 which generates a current pulse as the boom swings. The graph 50 shows the relationship between the sensing coil output and the tilt of the pivotal axis when a current pulse of predetermined magnitude is passed through the calibration coil 36. Graph 52 illustrates the relationship between sensing coil output and tilt when the calibration pulse is sent through the other calibration coil 38. When the seismometer is level, so that axis 14 is vertical, the sensing coil output is at the level 1.0 for a pulse in either calibration coil 36 or 38. When the pivotal axis 14 tilts in a positive direction (+degrees tilt on the graph) which moves the slug 40 further away from calibration coil 36, then a pulse in that coil produces a smaller swing of the boom, while a pulse in the other coil produces a larger boom swing and vice versa. The calibration curve of FIG. 5 may be produced by measurements in Earth gravity, and may be adjusted to give accurate indications of tilt angle for any other known gravity strength, such as the strength on the moon or on another planet.

Figure 2:
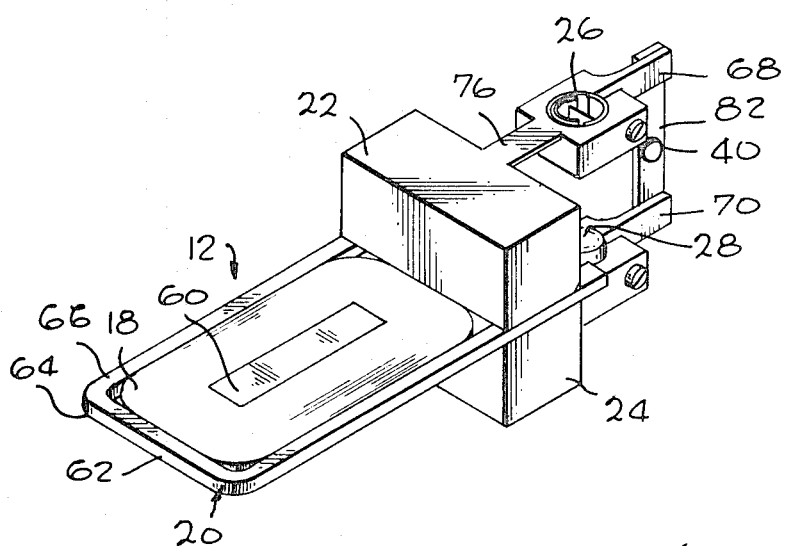
FIG. 2 is a perspective view of the boom of the seismometer mechanism of FIG. 1.

The seismometer is constructed for extreme compactness and ruggedness. As shown in FIG. 2, the sensing coil 18 is wound about an elongated core 60 to build up a relatively flat coil. After the coil is wound, it is mounted on the coil frame 20 by cementing it in place. The frame 20 has a body 62 of electrically insulating material, and has a layer or film 64, 66 on either side of the electrically conductive material, the frame being constructed in the same manner as typical etched circuit boards. The ends of the coil 18 are electrically connected to the conductive layers 64, 66. The mass members 22, 24 which provide most of the mass of the boom, are constructed of electrically conductive material of at least moderately high density, such as brass. They are joined to opposite sides of the coil frame 20, and each is in electrical contact with one of the conductive layers 64 or 66 on the coil frame. Each mass member has an inner end 68, 70 which is connected by one of the Cardin hinges 26, 28 to the main frame of the seismometer.

Each Cardin hinge includes a pair of electrically conductive resilient members of a material such as spring steel, each resilient member having one end fixed to the boom and the other end fixed to the main frame. The two elastic members of each hinge extend perpendicular to each other, and therefore are seen to cross one another as viewed along the axis of the hinge, as in FIG. 3, or in other words, they are crossed. As shown in FIG. 1, a pair of mounts 72, 74 are provided on the main frame for holding those ends of the Cardin hinge members which are fixed relative to the main frame. These mounts 72, 74 are connected to the two output terminals 34 on the main frame from which sensing coil currents are delivered to data processing equipment or the like. Thus, current generated by the sensing coil 18 passes along the two conductive layers 64, 66 on the coil frame, through the two mass members 22, 24 that hold the coil frame, through the Cardin hinges 26, 28 which mount the mass members on the main frame, and through the mounts 72, 74 to the output terminals 34.

It would be possible to run a pair of wires directly from the sensing coil 18 to the output terminals 34, to eliminate the need for electrical connections through the hinges. However, such wires would have to be very thin to prevent interference with swinging of the boom, and such thin wires could be easily broken. By using two Cardin hinges which are electrically insulated from each other and transmitting current through them, the need for delicate wires to conduct current from the boom is eliminated.

The boom could be constructed with the ends of the sensing coil 18 connected directly to the mass members 22 and 24 instead of through conductive layers on the coil frame 20. However, the coil 18 is generally wound with extremely fine wire such as wire of one-thousandth inch diameter, and it could be damaged before connection to the mass members. Instead, the coil is mounted on the coil frame 20 immediately after it is wound so that the entire coil and frame may be thereafter handled as a unit. The conductive layers 64, 66 on the coil frame are much more rugged than a free standing wire, and the coil frame can be securely connected to the mass members 22, 24.

Each of the mass members 22, 24 has a web portion 76, with a width and length each at least twice as great as its thickness, that connects most of the mass of the mass member to the inner end 68 or 70 thereof. The webs 76 are oriented so that imaginary lines normal to their faces are substantially parallel to the axis of pivoting 14 of the boom. The reason for providing the webs 76 is to allow the mass members 22, 24 to deflect sidewardly in a direction perpendicular to the usual direction in which the boom pivots. If the seismometer is jolted, and the mass members 22, 24 tend to move sidewardly until the coil frame hits a magnet, the webs 76 deflect and allow such movement to occur without excessively straining the Cardin hinges, thereby protecting the hinges against damage. Stops 78, 80 are also provided to prevent excessive boom pivoting about its axis of pivoting 14.

The iron slug 40 which interacts with the calibration coils 36, 38 is mounted on a strip 82 of insulating material, which extends between the inner ends 68, 70 of the mass members. The strip 82 is located so that the slug 40 and the calibration coils that interact with it are on a side of the axis of pivoting 14 opposite the side where the sensing coil 18 and the permanent magnets 30, 32 are located. This places the calibration coils 36, 38 away from the sensing coil 18 to minimize the influence of the magnetic field produced by the calibration coils on the sensing coil. It may be noted that the calibration coils are used not only to sense leveling, but to measure the amount of pivoting of the boom for a given impulse to it, to verify the operating characteristics of the instrument. The seismometer is generally transported and landed with the boom clamped in a predetermined position to prevent its movement. FIG. 3 shows a clamp plunger 84 which bears against the boom to prevent pivoting. After the instrument has been landed, the clamp is released and calibrations may be made to determine whether the boom is free to pivot and to determine the leveling of the seismometer. The seismometer has three calibration coil terminals 86 through which currents are delivered to the calibration coils on command.

Thus, the invention provides a compact and rugged seismometer which enables a remote determination of seismometer leveling. A determination of leveling is achieved by the use of a pair of calibration means for urging the boom to pivot in opposite directions, the amount of boom movement resulting from such impulses indicating the degree of leveling. The rugged-ness of the seismometer is increased by eliminating thin free-standing wires for connecting a coil on the boom to the main frame, and instead connecting the coil through a pair of hinge members that pivotally support the boom. It may be noted that a similar seismometer construction can be employed for a seismometer that measures vertical quake components and whose boom is pivotally mounted about a nominally horizontal axis. A pair of calibration coils then indicates the angle of the axis from a true horizontal.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A seismometer comprising:
   a main frame;
   a boom;
   means for mounting said boom on said frame to allow pivoting of said boom with respect to said frame about a nominally vertical axis while resiliently urging said boom toward a predetermined pivotal position;
   means for sensing the amount of pivoting of said boom; and
   first and second calibration means for urging said boom to pivot respectively in first and second opposite directions, irrespective of the position of the boom whereby to enable a measurement of the orientation of the axis of pivoting of said boom with respect to the vertical.

2. A seismometer comprising:
   a main frame;
   magnet means mounted on said frame;
   a flat substantially spiral coil;
   a coil frame of electrically insulative material extending about most of the periphery of said coil and supporting it;
   a pair of mass members mounted at opposite faces of said coil frame, said mass members constructed of electrically conductive material, electrically insulated from each other, and electrically coupled to different portions of said coil;
   a pair of hinges for pivotally coupling said mass members to said main frame so that said coil is positioned adjacent to said magnet means, said hinges constructed of electrically conductive material, electrically insulated from each other, and each electrically coupled to the mass member which it pivotally couples to said main frame; and
   a pair of output terminal means coupled to said hinges.

3. The seismometer described in claim 2 wherein:
   said coil frame has electrically conductive layers on its opposite faces that are directly connected to different portions of said coil; and
   each of said mass members is connected to a different one of said conductive layers, whereby to facilitate construction of the seismometer.

4. A seismometer comprising:
   a frame;
   magnet means mounted on said frame;
   a boom including a sensing coil and a portion of magnetically attractive material spaced from said coil;
   means for pivotally mounting said boom on said frame so that said sensing coil is urged toward a predetermined pivotal position where it lies adjacent to said magnet means while said portion of magnetically attractive material is spaced from said magnet means;
   first and second calibration coils mounted on opposite sides of said portion of magnetically attractive material for respectively urging said boom to pivot in opposite directions; and sensing terminal means electrically coupled to said sensing coil.

5. The seismometer described in claim 4 wherein:
said sensing coil and said portion of magnetically attractive material are on diametrically opposite sides of the axis of pivoting of said boom.

6. A seismometer comprising:
a frame;
magnet means mounted on said frame; and
a boom including a coil adjacent to said magnet means, mass means for supporting said coil, and hinge means for pivotally supporting said mass means on said frame, said mass means including a pair of spaced web portions coupling the major portion of said mass means to said hinge means, each web portion having a width and length each at least twice as great as its thickness, said web portions oriented so that imaginary lines normal to their faces are substantially parallel to the axis of pivoting of said mass means on said frame, whereby to protect said hinge means.

7. A seismometer comprising:
a main frame;
a boom;
means for mounting said boom on said frame to allow pivoting of said boom with respect to said frame about a nominally vertical axis while resiliently urging said boom toward a predetermined pivotal position; said boom having first and second portions on opposite sides of its axis of pivoting, and said second portion including magnetically attractive material;
means for sensing the amount of pivoting of said boom, including a sensing coil mounted on said first portion of said boom, and a magnet mounted on said frame adjacent to said coil to induce currents in it; and
first and second calibration coils mounted on opposite sides of said magnetically attractive material, for urging said boom to pivot in first and second opposite directions, respectively, whereby to isolate the magnetic field produced by said first and second calibration coils from said sensing coil.

8. The seismometer described in claim 7 wherein:
each of said calibration coils has a threadably mounted core of magnetically attractive material for screwing toward and away from said magnetically attractive material, whereby to enable adjustments to be made so that each calibration coil produces the same output from said sensing coil when the axis of pivoting of the boom is precisely vertical with respect to local gravity.

9. A seismometer comprising:
a main frame;
a boom assembly including a coil with first and second ends where electrical connections can be made;
a pair of hinges for pivotally mounting said boom on said frame, each hinge including a pair of crossed resilient members of electrically conductive material having opposite ends fixed to said boom and frame, respectively, said first and second ends of said coil electrically coupled to different ones of said hinges;
a pair of output terminal means mounted on said frame and electrically coupled to different ones of said hinges; and
magnet means mounted on said frame adjacent to said coil for creating a magnetic field in the vicinity of said coil;
said boom including first and second mass members of electrically conductive material electrically connected to different ones of said pair of hinges, said mass members electrically insulated from each other; and
said first and second ends of said coils being electrically coupled to said first and second mass members, respectively, so that each mass member electrically couples a coil end with a hinge.

10. The seismometer described in claim 9 wherein:
each of said mass members has a web region with a width and length each at least twice as great as its thickness, connecting a majority of the mass of the mass member to a hinge, each of said web regions oriented so that an imaginary line normal to the faces of the web region is substantially parallel to the axis of pivoting of said boom, whereby to reduce the possibility of damage to said hinge.

* * * * *